(12) United States Patent
Jones et al.

(10) Patent No.: US 11,732,161 B2
(45) Date of Patent: Aug. 22, 2023

(54) MASKING FILM FOR PROTECTING SENSITIVE SUBSTRATES

(71) Applicant: TREDEGAR SURFACE PROTECTION, LLC, Richmond, VA (US)

(72) Inventors: Gregory K. Jones, Richmond, VA (US); Bankim Bhupendra Desai, Chesterfield, VA (US); Carl Douglas Ray, Chesterfield, VA (US); Sukwoo Park, Richmond, VA (US); Kevin A. Brady, Cary, IL (US)

(73) Assignee: TREDEGAR SURFACE PROTECTION, LLC, N. Chesterfiel, VA (US)

( * ) Notice: Subject to any disclaimer, the term of this patent is extended or adjusted under 35 U.S.C. 154(b) by 175 days.

(21) Appl. No.: 16/713,339

(22) Filed: Dec. 13, 2019

(65) Prior Publication Data
US 2020/0190371 A1    Jun. 18, 2020

Related U.S. Application Data

(60) Provisional application No. 62/781,253, filed on Dec. 18, 2018.

(51) Int. Cl.
*C09J 7/40*       (2018.01)
*B32B 27/08*   (2006.01)
(Continued)

(52) U.S. Cl.
CPC .............. *C09J 7/401* (2018.01); *B32B 7/06* (2013.01); *B32B 27/08* (2013.01); *B32B 27/302* (2013.01);
(Continued)

(58) Field of Classification Search
None
See application file for complete search history.

(56) References Cited

U.S. PATENT DOCUMENTS

| 4,927,709 A | 5/1990 | Parker et al. |
| 5,000,992 A | 3/1991 | Kelch |

(Continued)

FOREIGN PATENT DOCUMENTS

| CN | 1352674 A | 6/2002 |
| CN | 1450971 A | 10/2003 |

(Continued)

OTHER PUBLICATIONS

International Search Report and Written Opinion dated Feb. 27, 2020, for International Patent Application No. PCT/US2019/066165.

(Continued)

*Primary Examiner* — Alicia Chevalier
*Assistant Examiner* — Elaine M Vazquez
(74) *Attorney, Agent, or Firm* — Karceski IP Law, PLLC

(57) ABSTRACT

A masking film includes an adhesion layer that includes a blend of hydrogenated styrene block copolymer and low density polyethylene. The adhesion layer has an outer adhesion surface configured to contact a substrate. The outer adhesion surface has an average surface roughness Ra of between 100 nm and 350 nm, and an average spacing between peaks Sm of between 20 μm and 150 μm. The masking film also includes a release layer on a side of the adhesion layer opposite the outer adhesion surface.

11 Claims, 1 Drawing Sheet

(51) Int. Cl.
  *B32B 27/30* (2006.01)
  *B32B 27/32* (2006.01)
  *C09J 7/38* (2018.01)
  *C09J 7/24* (2018.01)
  *C09J 7/20* (2018.01)
  *B32B 7/06* (2019.01)

(52) U.S. Cl.
  CPC ............... *B32B 27/32* (2013.01); *C09J 7/201* (2018.01); *C09J 7/243* (2018.01); *C09J 7/383* (2018.01); *C09J 7/387* (2018.01); *B32B 2250/246* (2013.01); *B32B 2405/00* (2013.01); *C09J 2203/31* (2013.01); *C09J 2301/414* (2020.08); *C09J 2423/04* (2013.01); *C09J 2423/045* (2013.01); *C09J 2423/046* (2013.01); *C09J 2453/00* (2013.01)

(56) References Cited

U.S. PATENT DOCUMENTS

| | | | |
|---|---|---|---|
| 5,108,844 | A | 4/1992 | Blemberg et al. |
| 7,348,376 | B2 | 3/2008 | Gelles |
| 7,439,301 | B2 | 10/2008 | Handlin, Jr. |
| 8,043,682 | B2 | 10/2011 | Nonaka et al. |
| 8,182,926 | B2 | 5/2012 | Patel et al. |
| 8,652,601 | B2 | 2/2014 | Iwasaki et al. |
| 10,150,896 | B2 | 12/2018 | Santoso et al. |
| 2001/0020515 | A1 | 9/2001 | Shibata et al. |
| 2004/0137223 | A1 | 7/2004 | Hamulski et al. |
| 2004/0253464 | A1 | 12/2004 | Krawinkel |
| 2009/0186236 | A1* | 7/2009 | Patel ............ B32B 27/08 428/515 |
| 2013/0068367 | A1* | 3/2013 | Mikami ............ C09J 7/38 156/60 |
| 2013/0225020 | A1 | 8/2013 | Flood et al. |
| 2013/0295312 | A1 | 11/2013 | Balakoff et al. |
| 2014/0057064 | A1 | 2/2014 | Sasaki et al. |
| 2014/0335334 | A1 | 11/2014 | Huang et al. |
| 2014/0349053 | A1 | 11/2014 | Burke et al. |
| 2016/0177151 | A1* | 6/2016 | Santoso ............ C09J 153/025 428/352 |

FOREIGN PATENT DOCUMENTS

| | | |
|---|---|---|
| CN | 102834263 A | 12/2012 |
| CN | 103339077 A | 10/2013 |
| CN | 103717694 A | 4/2014 |
| CN | 104220548 A | 12/2014 |
| CN | 105383106 A | 3/2016 |
| CN | 107207925 A | 9/2017 |
| EP | 0479457 A1 | 4/1992 |
| EP | 2671851 A1 | 12/2013 |
| JP | H09143439 A | 6/1997 |
| TW | 201443194 A | 11/2014 |
| WO | 2013021788 A1 | 2/2013 |
| WO | 2014087814 A1 | 6/2014 |
| WO | 2014087815 A1 | 6/2014 |
| WO | 2014168069 A1 | 10/2014 |
| WO | 2016100763 A1 | 6/2016 |

OTHER PUBLICATIONS

International Preliminary Report on Patentability dated Jul. 1, 2021, for International Patent Application No. PCT/US2019/066165.
Extended European Search Report dated Sep. 5, 2022, for European Patent Application No. 19900900.2.
Chinese Office Action dated Jan. 5, 2023, for Chinese Patent Application No. 201980084109.9.

* cited by examiner

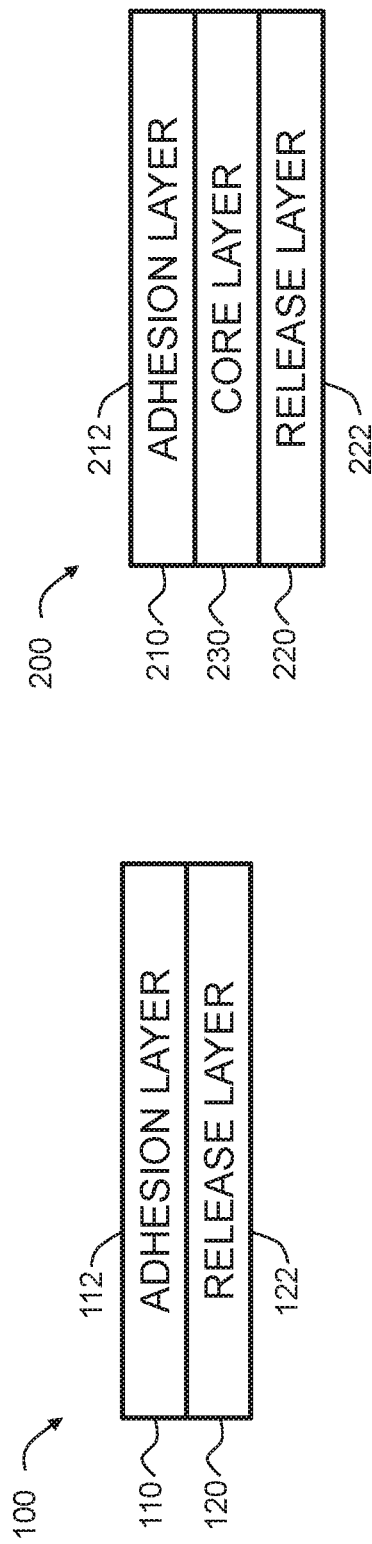

MASKING FILM FOR PROTECTING SENSITIVE SUBSTRATES

CROSS-REFERENCE TO RELATED APPLICATIONS

This application claims the benefit of priority from U.S. Provisional Patent Application No. 62/781,253, filed Dec. 18, 2018, the entire content of which is incorporated herein by reference.

FIELD

The present invention generally relates to a masking film for protecting sensitive substrates.

BACKGROUND

Masking films, also known as surface protection films, are typically used to provide a physical barrier to prevent damage, contamination, scratching, scuffing, and/or other marring of a substrate to which they are adhered. Masking films may be applied to delicate, sensitive substrates that are used as components of electronic displays and protect the substrates through one or more subsequent processing steps during manufacturing, as well as during shipping, and/or storage prior to use of the substrate.

Commonly used masking films achieve adhesion to substrates by van der Walls forces, which requires the masking film and substrate to each have at least one very flat and uniform surface so the masking film can intimately contact the substrate. The amount of adhesion can be increased or decreased by softening or hardening the composition of the masking film surface. Too much adhesion makes it difficult to remove the masking film from the substrate at the end of the process. Too little adhesion may result in the masking film separating prematurely from the substrate, so the substrate is no longer protected.

In addition, the masking film should adhere to the substrate without damaging the surface of the substrate during use or during removal of the masking film when the masking film is no longer needed. Some masking films are known to create a texture that changes the distinctness of image of the substrate the masking film is supposed to protect from damage. A substrate having a surface with such a texture is known to reflect light in a non-uniform manner and is typically unacceptable when the substrate is to be used as a component in, for example, an electronic display.

Adhesive-coated oriented polyester films may provide acceptable masking properties for such applications but are also relatively expensive. Previous efforts to minimize texture that changes the distinctness of image with a less-expensive polyethylene film have involved making both surfaces of the film as smooth as possible, without causing blocking (i.e., sticking) in a wound roll. Reducing surface roughness of the surfaces of the polyethylene film only made slight improvements in the resulting substrate texture.

It is desirable to have a masking film that provides the desired surface protection of a substrate without leaving a texture on the substrate and is more economical than an adhesive-coated oriented polyester film.

SUMMARY

It has been unexpectantly found that, by using a softer polymer formulation and creating at least one surface with a suitably embossed microtexture, damage to delicate substrates can be minimized or even avoided while maintaining adequate adhesion to the substrate. The combination of softness and microtexture creates a particular type of surface structure that does not affect the distinctness of image of the substrate. The surface roughness also does not contribute to roll blocking, and also improves web handling over known films with smooth surfaces.

According to an aspect of the invention, there is provided a masking film that includes an adhesion layer that includes a blend of hydrogenated styrene block copolymer and low density polyethylene. The adhesion layer has an outer adhesion surface configured to contact a substrate. The outer adhesion surface has an average surface roughness Ra of between 100 nm and 350 nm, and an average spacing between peaks Sm of between 20 μm and 150 μm. The masking film also includes a release layer on a side of the adhesion layer opposite the outer adhesion surface.

In an embodiment, the adhesion layer also includes high density polyethylene.

In an embodiment, the adhesion layer blend includes 15 wt %-80 wt % hydrogenated styrene block copolymer, 5 wt %-50 wt % low density polyethylene, and 10 wt %-40 wt % high density polyethylene.

In an embodiment, the adhesion layer blend includes 40 wt %-70 wt % hydrogenated styrene block copolymer, 5 wt %-30 wt % low density polyethylene, and 10 wt %-40 wt % high density polyethylene.

In an embodiment, the outer adhesion surface has an average surface roughness Ra of between 125 nm and 325 nm, and an average spacing between peaks Sm of between 20 μm and 100 μm.

In an embodiment, the release layer includes low density polyethylene. In an embodiment, the release layer includes a blend of low density polyethylene and high density polyethylene.

In an embodiment, the masking film also includes a core layer in between the adhesion layer and the release layer. In an embodiment, the core layer includes a blend of high density polyethylene and low density polyethylene. In an embodiment, the core layer blend includes 30 wt %-50 wt % low density polyethylene and 50 wt %-70 wt % high density polyethylene. In an embodiment, the core layer includes polypropylene.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

FIG. 1 schematically illustrates a masking film according to an embodiment of the invention; and FIG. 2 schematically illustrates a masking film according to an embodiment of the invention.

DETAILED DESCRIPTION

As used herein, the term "film" means a thin sheet or web produced by a cast extrusion or blown process. The films of this disclosure are made of polymers. The polymer may be further processed between rollers and cooled to form the web. Multilayer films may be produced by extruding different layers simultaneously in a coextrusion process or by forming each film layer separately and then bonding or laminating the individual films together. In an embodiment, the multiple layers of the masking film are co-extruded using any co-extrusion process known in the art. The use of co-extrusion allows for the relatively simple and easy manufacture of a multi-layered masking film composed of distinct layers, each performing specific functions.

FIG. 1 schematically illustrates a masking film 100 according to an embodiment of the invention. As illustrated, the masking film 100 is a multilayer film that includes an adhesion layer 110 having an outer adhesion surface 112, and a release layer 120 on an opposite side of the adhesion layer 110 than the outer adhesion surface 112. The release layer 120 includes an outer release surface 122. The outer adhesion surface 112 of the adhesion layer 110 is configured to contact a surface of a substrate to be protected by the masking film 100.

FIG. 2 schematically illustrates a masking film 200 according to an embodiment of the invention. As illustrated, the masking film 200 is a multilayer film that includes an adhesion layer 210 having an outer adhesion surface 212, a release layer 220 on an opposite side of the adhesion layer 210 than the outer adhesion surface 212, and a core layer 230 in between the adhesion layer 210 and the release layer 220. The release layer 220 includes an outer release surface 222. The outer adhesion surface 212 of the adhesion layer 210 is configured to contact a surface of a substrate to be protected by the masking film 200.

Adhesion Layer

As referred to herein, "adhesion" means adherence to a surface of the substrate to be protected through intimate contact via the natural blocking adhesion that exists between a very smooth surface and another smooth surface via polar bonding, ionic bonding and, in some instances, hydrogen bonding, and/or Van der Waals secondary bonding. The adhesive-less adhesion intended herein is a releasable adhesion where the adhesion is reversible such that neither the film nor the substrate to which it is applied is modified or damaged. "Adhesion" does not include materials known as pressure sensitive adhesives, heat bonding or cross-linking functionality of adhesives as the adhesion force between the substrate surface and a film with pressure sensitive adhesives, heat bonding or cross-linking functionality of adhesives is elevated to a point where the peel strength needed to remove such a film will exceed the tensile strength of such a film itself thus causing such a film to tear or break before it will peel away from the substrate.

The adhesion layers 110, 210 according to embodiments of the masking film 110, 200 may include a blend of hydrogenated styrene block copolymer and low density polyethylene (LDPE). In an embodiment, the adhesion layer 110, 210 also includes high density polyethylene (HDPE).

The hydrogenated block copolymer has a polystyrene block-polydiene block polymer structure prior to hydrogenation. The hydrogenated block copolymer, before hydrogenation, can be linear or radial. Suitable polydienes include polybutadiene (1,3-butadiene), polyisoprene and mixtures thereof. Hydrogenation of the polystyrene block-polydiene block structure results in a styreneethylene-(butylene/isoprene)-styrene polymeric structure, otherwise referred to as "SEBS". See U.S. Pat. Nos. 7,439,301, 7,348,376, U.S. Patent Application Publication No. 2013/0225020, International Patent Application Publication No. WO 2014/087814, and International Patent Application Publication No. WO 2014/087815 for further descriptions, all of which are incorporated herein by reference in their entireties.

The styrene content of the hydrogenated styrene block copolymer is desirably less than 40% by weight (wt %) of the copolymer, such as between about 30 and about 40 wt %, such as 34 wt %. Following hydrogenation of the polystyrene block-polydiene block polymer, from 0 to 10 percent of the styrene double bonds in the polystyrene block have been hydrogenated.

The melt flow rate ("MFR") of the hydrogenated styrene block copolymer is inversely correlated to viscosity of the hydrogenated styrene block copolymer. A high melt flow rate means that the styrene block copolymer has a low viscosity and vice versa. As used herein, unless otherwise stated, "melt index" or MFR shall mean the melt flow value determined according to ASTM D-1238, at 230° C. under a 2.16 kg mass. In an embodiment, the hydrogenated styrene block copolymer may have a melt index of greater than or equal to 12. In an embodiment, the hydrogenated styrene block copolymers may have a melt index of greater than or equal to 20. In an embodiment, the hydrogenated styrene block copolymer may have a melt index of greater than or equal to 40. In an embodiment, the hydrogenated styrene block copolymer may have a melt index of from about 20 to about 100. A suitable hydrogenated styrene block copolymer includes Kraton MD 6951 manufactured by Kraton Performance Polymers Inc., which has a styrene content of about 34 wt % and a MFR of 48.

The adhesion layer 110, 210 may comprise 10 wt % to 90 wt % hydrogenated styrene block copolymer and 10 wt % to 90 wt % LPDE. In an embodiment, the adhesion layer 110, 210 may comprise about 60 wt % hydrogenated styrene block copolymer and about 40 wt % LDPE, or about 80 wt % hydrogenated styrene block copolymer and 20 wt % LPDE. As such, the adhesion layer 110, 210 may include a mixture of hydrogenated styrene block copolymer and LDPE in a ratio range of about 100:0 to 51:49 by weight, including for example, ratios of about 80:20 and about 60:40.

In various embodiments, the adhesion layer 110, 210 may comprise 10% to 90%, by weight, hydrogenated styrene block copolymer. In particular embodiments, the adhesion layer 110, 210 may comprise 70% to 90%, by weight, hydrogenated styrene block copolymer. In such embodiments, the adhesion layer 110, 210 also may comprise 10% to 30%, by weight, LDPE, in a particular embodiment, the adhesion layer 110, 210 can consist essentially of the hydrogenated styrene block copolymer alone.

In an embodiment, the adhesion layer 110, 210 may comprise 15 wt % to 90 wt % styrene block copolymer (SEBS), 10 wt % to 50 wt % LDPE, and 10 wt % to 35 wt % HDPE. In an embodiment, the adhesion layer 110, 120 may comprise 15 wt %-80 wt % hydrogenated styrene block copolymer, 5 wt %-50 wt % low density polyethylene, and 10 wt %-40 wt % high density polyethylene. In an embodiment, the adhesion layer 110, 120 may comprise 40 wt %-70 wt % hydrogenated styrene block copolymer, 5 wt %-30 wt % low density polyethylene, and 10 wt %-40 wt % high density polyethylene.

As discussed herein, the average surface roughness will be defined as the average height (Ra) of the micropeaks and microvalleys of a surface to the center line of such surface (hereinafter "average surface roughness Ra") as measured by a profilometer. Surface roughness defined in this manner is typically expressed with units of microns or micrometers (μm) or units of nanometers (nm). In addition, the average spacing between the micropeaks (Sm) was measured with the profilometer. All testing of surface textures (relative roughness and spacing between peaks) were conducted in accordance with ANSI/ASME Test Method B46.1-1985. In accordance with embodiments of the invention, the outer adhesion surface 112, 212 of the adhesion layer 110, 210 has an average surface roughness Ra of between 100 nm and 350 nm, and an average spacing between peaks Sm of between 20 μm and 150 μm. In an embodiment, the outer adhesion surface 112, 212 of the adhesion layer 110, 210 has an average surface roughness Ra of between 125 nm and 325 nm, and an average spacing between peaks Sm of between about 20 μm and about 100 μm.

The thickness of the adhesion layer 110, 210 of the masking film 100, 200 in accordance with embodiments of the present invention may be between 1 μm and 20 μm, such as between 3 μm and 15 μm, such as 3 μm, 4 μm, 5 μm, 6 μm, 7 μm, 8 μm, 9 μm, 10 μm, 11 μm, 12 μm, 13 μm, 14 μm, or 15 μm.

Core Layer

The masking film 200 may comprise an optional core layer 230, as illustrated in FIG. 2. The core layer 230, when present, may be located contiguously between the adhesion layer 210 and the release layer 220. The core layer 230, when present, may include one or more polyolefins, such as low density polyethylene (LDPE), linear low density polyethylene (LLDPE), high density polyethylene (HDPE), medium density polyethylene, polypropylene (PP), random copolymer polypropylene, polypropylene impact copolymers, metallocene linear low density polyethylene, plastomers, poly(ethylene-co-vinyl acetate), poly(ethylene-co-acrylic acid), poly(ethylene-co-methyl acrylate), cyclic olefin polymers, polyamides, or poly(ethyleneco-n-butyl acrylate). Suitable polyolefins include low density polyethylene, high density polyethylene, polypropylene, polypropylene impact copolymers and mixtures thereof. One suitable polyolefin mixture is of low density polyethylene and high density polyethylene in a ratio in a range of 60:40 to 40:60 by weight.

The thickness of the core layer 230 of the masking film 200 in accordance with embodiments of the invention may be between 10 μm and 50 μm, such as 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm.

Release Layer

The release layer 120, 220 may be located contiguous to the adhesion layer 110, 210 or, when present, the core layer 230. The release layer 120, 220 may include one or more polyolefins, such as low density polyethylene (LDPE), linear low density polyethylene (LLDPE), high density polyethylene (HDPE), medium density polyethylene (MDPE), polypropylene (PP), random copolymer polypropylene, polypropylene impact copolymers, metallocene linear low density polyethylene, plastomers, poly (ethylene-co-vinyl acetate), poly (ethylene-co-acrylic acid), poly (ethylene-comethyl acrylate), cyclic olefin polymers, polyamides, or poly (ethylene-co-n-butyl acrylate). Suitable polyolefins include low density polyethylene (LDPE), high density polyethylene (HDPE), polypropylene (PP), polypropylene impact copolymers and mixtures thereof. In an embodiment, the release layer 120, 220 includes a suitable polyolefin mixture of low density polyethylene (LDPE) and high density polyethylene (HDPE) in a ratio of 60:40 to 40:60 by weight.

The thickness of the release layer 120, 220 may be between 1 μm and 20 μm, such as between 1 μm and 10 μm, such as 1 μm, 2 μm, 3 μm, 4 μm, 5 μm, 6 μm, 7 μm, 8 μm, 9 μm or 10 μm. The relatively rough surface of the release layer 120, 220 generally possesses an average surface roughness Ra of between 0.3 μm and 16 μm, and more desirably, between 0.7 μm and 8 μm.

Substrates

While the masking films 100, 200 of the present invention may be applied to any substrate, typical substrates include, by way of illustration only, polycarbonates, acrylics, polyvinylchlorides, polyethylene terephthalate (PET), glycol modified polyethylene terephthalate (PETG), polyim ides, glass, ceramics and metals.

Application of Masking Film to Substrates

Any of a variety of conventional methods can be utilized for applying the multilayer masking film 100, 200 to the substrate and for pressing the applied masking film 100, 200 against the smooth surface of the substrate. Generally speaking, the masking film 100, 200 will be taken off from a roll and will be directly applied to the substrate by means of a nip roll or similar system through which the masking film 100, 200 and the substrate are passed. As the masking film 100, 200 is pulled off the roll, the spiral orientation of the masking film 100, 200 on the roll has the adhesion layer 110, 210 disengaging from the release layer 120, 220 as the masking film 100, 200 is removed from the roll.

EXAMPLES

Comparative Example 1 was a prior art masking film made from oriented polyethylene terephthalate (PET) coated with an acrylic adhesion material. The PET layer had a thickness of about 140 μm and the acrylic adhesion layer had a thickness of about 50 μm.

Comparative Example 2 was a prior art monolayer masking film made from a blend of low density polyethylene and a masterbatch containing an antioxidant. The thickness of the monolayer masking film was about 45 μm.

Comparative Example 3 was a prior art monolayer masking film made from a blend of LDPE and a masterbatch containing an antioxidant. The thickness of the monolayer masking film was about 80 μm.

Comparative Example 4 was a three-layer masking film having an adhesion layer made from a blend of about 45 wt % hydrogenated styrene block copolymer (SEBS), about 30 wt % HDPE, and about 25 wt % LDPE, a core layer made from a blend of about 60 wt % HDPE, about 39 wt % LDPE, and about 1 wt % masterbatch containing an antioxidant, and a release layer made from a blend of about 80 wt % LDPE, about 19 wt % HDPE, and about 1 wt % masterbatch containing an antioxidant. The adhesion layer had a thickness of about 10.0 μm, the core layer had a thickness of about 32.5 μm, and the release layer had a thickness of about 7.5 μm.

Example 1 was a three-layer masking film according to an embodiment of the present invention. The three-layer masking film had an adhesion layer made from a blend of about 55 wt % hydrogenated styrene block copolymer (SEBS), about 30 wt % HDPE, and about 15 wt % LDPE, a core layer made from a blend of about 55 wt % HDPE and about 45 wt % LDPE, and a release layer made from a blend of about 99 wt % LDPE and about 1 wt % masterbatch containing an antioxidant. The adhesion layer had a thickness of about 4.2 μm, the core layer had a thickness of about 21.0 μm, and the release layer had a thickness of about 2.8 μm.

Example 2 was a three-layer masking film according to an embodiment of the present invention. The three-layer masking film had an adhesion layer made from a blend of about 60 wt % hydrogenated styrene block copolymer (SEBS), about 25 wt % LDPE, and about 15 wt % HDPE, a core layer made from a blend of about 60 wt % HDPE and about 40 wt % LDPE, and a release layer made from a blend of about 60 wt % HDPE and about 40 wt % LDPE. The adhesion layer had a thickness of about 7.5 μm, the core layer had a thickness of about 18.0 μm, and the release layer had a thickness of about 4.5 μm.

Example 3 was a three-layer masking film according to an embodiment of the present invention. The three-layer masking film had an adhesion layer made from a blend of about 55 wt % hydrogenated styrene block copolymer (SEBS), about 30 wt % LDPE, and about 15 wt % HDPE, a core layer made from a blend of about 55 wt % HDPE and about 45 wt % LDPE, and a release layer made from a blend of about 99 wt % LDPE and about 1 wt % masterbatch containing an antioxidant. The adhesion layer had a thickness of about 10.0 μm, the core layer had a thickness of about 35.0 μm, and the release layer had a thickness of about 5.0 μm.

Example 4 was a three-layer masking film according to an embodiment of the present invention. The three-layer masking film had an adhesion layer made from a blend of about 65 wt % hydrogenated styrene block copolymer (SEBS), about 30 wt % HDPE, and about 5 wt % LDPE, a core layer made from a blend of about 55 wt % HDPE and about 45 wt % LDPE, and a release layer made from a blend of about 99 wt % LDPE and about 1 wt % masterbatch containing an antioxidant. The adhesion layer had a thickness of about 10.0 μm, the core layer had a thickness of about 35.0 μm, and the release layer had a thickness of about 5.0 μm.

Example 5 was a three-layer masking film according to an embodiment of the present invention. The three-layer masking film had an adhesion layer made from a blend of about 48 wt % hydrogenated styrene block copolymer (SEBS), about 30 wt % HDPE, and about 22 wt % LDPE, a core layer made from a blend of about 55 wt % HDPE and about 45 wt % LDPE, and a release layer made from a blend of about 99 wt % LDPE and about 1 wt % masterbatch containing an antioxidant. The adhesion layer had a thickness of about 13.0 μm, the core layer had a thickness of about 45.5 μm, and the release layer had a thickness of about 6.5 μm.

The adhesion layer of each of Comparative Examples 1-4 and Examples 1-5 were tested for average surface roughness Ra and the average spacing between peaks Sm, as well as hardness. Each of Comparative Examples 1-4 and Examples 1-5 were placed on a substrate with the adhesion layer contacting the substrate, and then peeled off of the substrate. Indications of the adhesion to the substrate and the texture that was created on the substrate were provided on the scale of "Low" to "High", with "Medium" in between "Low" and "High". The results of the surface roughness, hardness, adhesion to the substrate and texture created on the substrate are listed in Table I below.

TABLE I

Adhesive Surface Properties

| Sample | Ra (nm) | Sm (μm) | Hardness | Texture Created on Substrate | Adhesion to Substrate |
|---|---|---|---|---|---|
| Comparative Example 1 | 15 | 83 | Low | Low | High |
| Comparative Example 2 | 75 | 206 | High | High | Low |
| Comparative Example 3 | 57 | 248 | High | Medium | Low |
| Comparative Example 4 | 58 | 101 | Medium | Low | High |
| Example 1 | 318 | 78 | Medium | Low | Medium |
| Example 2 | 145 | 95 | Medium | Low | Medium |
| Example 3 | 126 | 67 | Medium | Low | Low |
| Example 4 | 139 | 68 | Medium | Low | Medium |
| Example 5 | 282 | 23 | Medium | Low | Low |

It is desirable to have "Low" texture created on the substrate, and each of Examples 1-5 met this criteria. It is also desirable to have "Low" to "Medium" adhesion to the substrate, and each of Examples 1-5 met this criteria.

Without being bound by theory, it is postulated that by using a softer polymer formulation and creating an adhesion surface with a suitably embossed microtexture, damage to delicate substrates can be minimized or even avoided while maintaining adequate adhesion to the substrate. The combination of softness and microtexture at the adhesion surface creates a particular type of surface structure that does not create undesirable texture, such as a texture that decreases the distinctness of image, on the substrate. Masking films in accordance with embodiments of the invention were found to substantially increase the distinctness of image of the substrates the masking films were adhered to, as compared to prior art masking films, as noted above.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A masking film comprising:
an adhesion layer comprising a blend of hydrogenated styrene block copolymer and low density polyethylene, the adhesion layer having an outer adhesion surface configured to contact a substrate, the outer adhesion surface having an average surface roughness Ra of between 100 nm and 350 nm, and an average spacing between peaks Sm of between 20 μm and 150 μm as measured by a profilometer in accordance with ANSI/ASME Test Method B46.1-1985; and
a release layer on a side of the adhesion layer opposite the outer adhesion surface.

2. The masking film according to claim 1, wherein the adhesion layer blend further comprises high density polyethylene.

3. The masking film according to claim 2, wherein the adhesion layer blend comprises 15 wt %-80 wt % hydrogenated styrene block copolymer, 5 wt %-50 wt % low density polyethylene, and 10 wt %-40 wt % high density polyethylene.

4. The masking film according to claim 3, wherein the adhesion layer blend comprises 40 wt %-70 wt % hydrogenated styrene block copolymer, 5 wt %-30 wt % low density polyethylene, and 10 wt %-40 wt % high density polyethylene.

5. The masking film according to claim 1, wherein the outer adhesion surface has an average surface roughness Ra of between 125 nm and 325 nm, and an average spacing between peaks Sm of between 20 μm and 100 μm as measured by a profilometer in accordance with ANSI/ASME Test Method B46.1-1985.

6. The masking film according to claim 1, wherein the release layer comprises low density polyethylene.

7. The masking film according to claim 6, wherein the release layer comprises a blend of low density polyethylene and high density polyethylene.

8. The masking film according to claim 1, further comprising a core layer in between the adhesion layer and the release layer.

9. The masking film according to claim 8, wherein the core layer comprises a blend of high density polyethylene and low density polyethylene.

10. The masking film according to claim 9, wherein the core layer blend comprises 30 wt %-50 wt % low density polyethylene and 50 wt %-70 wt % high density polyethylene.

11. The masking film according to claim 8, wherein the core layer comprises polypropylene.

* * * * *